United States Patent
Mou et al.

[11] Patent Number: 5,876,690
[45] Date of Patent: Mar. 2, 1999

[54] MESOPOROUS ALUMINOSILICATE MOLECULAR SIEVES HAVING "TUBULES-WITHIN-A-TUBULE" HIERARCHICAL ORDER MORPHOLOGY AND THE PREPARATION THEREOF

[75] Inventors: Chung-Yuan Mou; Hong-Ping Lin, both of Taipei, Taiwan

[73] Assignee: National Science Council, Taiwan

[21] Appl. No.: 798,609

[22] Filed: Feb. 11, 1997

[51] Int. Cl.[6] ............................. C01B 39/02; C01B 39/04
[52] U.S. Cl. ......................... 423/702; 423/705; 423/716
[58] Field of Search ................................... 423/701, 702, 423/704, 705, 716, 528.1, 328.2

[56] References Cited

U.S. PATENT DOCUMENTS

| | | | |
|---|---|---|---|
| 5,108,725 | 4/1992 | Beck et al. | 423/263 |
| 5,112,589 | 5/1992 | Johnson et al. | 423/705 |
| 5,695,735 | 12/1997 | Benazzi et al. | 423/701 |

FOREIGN PATENT DOCUMENTS

| | | | |
|---|---|---|---|
| 093519 | 11/1983 | European Pat. Off. | 423/716 |

OTHER PUBLICATIONS

Beck et al. "A New Family of Mesoporous Molecular Sieves Prepared with Liquid Crystal Templates," J. Am. Chem. Soc., vol. 114, p. 10834, 1992.

Lin et al., "Tubules–Within–a Tuble" Hierarchical Order of Mesoporous Molecular Sieves in MCM–41, Science 273:765–768, Aug. 9, 1996.

*Primary Examiner*—Mark L. Bell
*Assistant Examiner*—David Sample
*Attorney, Agent, or Firm*—Fish & Richardson P.C.

[57] ABSTRACT

The present invention relates to a method for synthesizing mesoporous aluminosilicate and pure silica molecular sieves of new micro-tubular morphology. The wall of the micro-tubules contains coaxial cylindrical pores of nanometer size. The diameter of the hollow tubular is adjustable from 0.1 to 3 micrometer by varying the reaction conditions such as the surfactant/water ratio, the addition of salts or cosurfactants, the surfactants with different carbon chain length and the silicon/aluminum ratio.

12 Claims, 6 Drawing Sheets

US 5,876,690

MESOPOROUS ALUMINOSILICATE MOLECULAR SIEVES HAVING "TUBULES-WITHIN-A-TUBULE" HIERARCHICAL ORDER MORPHOLOGY AND THE PREPARATION THEREOF

FIELD OF THE INVENTION

The present invention relates to a mesoporous (pore diameter of about 1–20 nm) aluminosilicate or pure silica molecular sieve, and in particular to a mesoporous aluminosilicate or pure silica molecular sieve mainly composed of micro-tubular particles having coaxial cylindrical pores of nanometer (nm) size.

BACKGROUND OF THE INVENTION

Recently, the discovery of the new family of crystalline mesoporous materials M41S by researchers at Mobil Corp. (U.S. Pat. No. 5,108,725) has attracted great attention. These mesoporous molecular sieves with adjustable and uniformed pore sizes in the range of 1.5 to 10.0 nm, cover a new range of potential applications. One member of this series, MCM-41, possessing a hexagonal arrangement of uniformly sized channel mesopores, has been the focus of most recent applications as catalysts and sorbents.

Because the MCM-41 materials were formed from a complex mixture of surfactants and silicate, it was suggested that the behavior of the system might be variable. However, literature reported that the morphology of MCM-41 material was in the microparticle form only. We believe that this is due to that the silicate structure, prepared from acidified silicate or highly condensed silicate, are too rigid to bend into other morphologies. Thus, we think that there is an opportunity to change the morphology of MCM-41 products to a novel structure by using a soft or less condensed silicon source.

SUMMARY OF THE INVENTION

The primary object of this invention is to provide micro-tubular morphology of mesoporous aluminosilicate and pure silica molecular sieves, and a new and convenient method, "Delayed neutralization process", to synthesize the micro-tubular morphology of mesoporous aluminosilicate and pure silica molecular sieves.

The mesoporous aluminosilicate and pure silica molecular sieves synthesized in accordance with the present invention, after calcined, have the following composition: $M_{n/q}(Al_aSi_bO_c)$ wherein M is one or more ions selected from the group consisting of hydrogen, ammonium, alkali metal and alkaline earth metal;

n is the charge of the composition excluding the M expressed as oxide;

q is the weighted molar average valence of M;

a and b are mole fractions of Al and Si, respectively, and a+b =1, and b>0; and c is a number of from 1 to 2.5;

said molecular sieves having a microstructure composed of microparticles having a hexagonal arrangement of uniformly-sized pores having a diameter of 1.3–20 nm and exhibiting a hexagonal electron diffraction pattern that can be indexed with a $d_{100}$ value greater than 1.8 nm, wherein the improvement comprises from about 30 to about 100% of said microparticles being in the substantially tubular form, said substantially tubular microparticles having a diameter of about 0.1–20 $\mu$m, and said substantially tubular microparticles having a wall comprising coaxial uniformly-sized pores having a diameter of about 1.3–20 nm and exhibiting a hexagonal electron diffraction pattern that can be indexed with a $d_{100}$ value greater than 1.8 nm.

Preferably, M is an alkali metal ion, and more preferably M is sodium ion.

Preferably, the molecular sieves of the present invention after calcined have a $SiO_2:Al_2O_3$ molar ratio ranging from about 0:0.2.

Preferably, the molecular sieves of the present invention after calcined have from about 70 to about 100% of said microparticles being in the substantially tubular form, and said substantially tubular microparticles having a diameter of about 0.1–5 $\mu$m.

The "Delayed neutralization process" for preparing the molecular sieves of the present invention involves the following steps:

a) preparing an aqueous mixture comprising sources of a silicon oxide and a surfactant of $R_1R_2R_3R_4Q^+X^-$ and optionally an oxide of aluminum, and having a composition, in terms of mole ratios, within the following range:

1 $SiO_2$:(0–0.2) $Al_2O_3$:(0.2–0.7) surfactant:(0–0.5) $M_{2/e}O$ (10–1000) $H_2O$ wherein at least one of $R_1$, $R_2$, $R_3$, and $R_4$ is selected from the group consisting of aryl of from 6 to 36 carbon atoms, alkyl of from 6 to 36 carbon atoms and combination thereof, the remainders of $R_1$, $R_2$, $R_3$, and $R_4$ are hydrogen or alkyl of from 1 or 5 carbon atoms;

$Q^+$ is nitrogen or phosphorous ion; and $X^-$ is an counterion;

M is alkali metal or alkaline earth metal ion; and e is the weighted average valence of M;

b) agitating said aqueous mixture at a temperature of from 0° C. to room temperature for about 10 minutes to 2 hours to form a gel mixture;

c) to the gel mixture adding an acid in an amount, in terms of mole ratio, within 1 $SiO_2$:(0.1–1.0) $H^+$, preferably 1 $SiO_2$:(0.2–0.45) $H^+$, while maintaining the agitation, wherein said acid is added gradually or incrementally so that the addition is completed within a period of from about 5 minutes to 2 hours;

d) heating the resulting mixture of step c) at a temperature of from about 50° C. to 200° C. for a period of time which is sufficient to form a molecular sieve; and e) recovering the molecular sieve.

Preferably, the resulting mixture from step c) is kept at room temperature with or without agitation for a period of from 5 minutes to one hour prior to the heating.

Preferably, said composition in step a), in terms of mole ratios, is within the following range: 1 $SiO_2$:(0–0.05) $Al_2O_3$: (0.35–0.65) surfactant: (0.35–0.5) $Na_2O$:(60–110) $H_2O$.

Preferably, $R_1$ of said surfactant is $C_8$–$C_{20}$ alkyl; $R_2$, $R_3$, and $R_4$ is $C_1$–$C_3$ alkyl; $Q^+$ is nitrogen ion; and $X^-$ is halide.

In our newly proposed synthetic method, the micelles of the surfactant first combine with less condensed silicate at high alkalinity to form a soft intermediate. The intermediate structure can be bent into a hierarchical hollow tubular structure by the chemical force of gradually silica condensation. The formation of this highly ordered structure is a biomimetic process and the hierarchical structure is alike to that of frustles of marine diatoms.

The dimensions of the micro-tubule are sensitive to the compositions of the reaction conditions. Various controllable factors, such as surfactant concentration, water content, the carbon chain length of the surfactant, addition of alkali metal salts or $C_1$–$C_8$ alcohol as a cosurfactant (1–50 mol % of the surfactant), the silicon/aluminum ratio and temperature, have a significant influence on the dimension and shape of these tubules of aluminosilicate and pure silica crystalline products. This provided an advantageous technique that we could easily modify the size of the microtubule in the range of 0.1 to 3 μm.

In addition to the basic application in catalysts, supporters and sorbents, these tubular materials also have technological as well as fundamental usage. The hollow tubular could be used as controllable drug-delivery system, in separation technology and templates for producing the micro-sized conducting wires and opticoelectronics.

BRIEF DESCRIPTION OF THE DRAWINGS

FIG. 8 shows a transmission electron microscopy (TEM) image of the calcined aluminosilicate crystalline material shown in FIG. 1.

Figure 1:
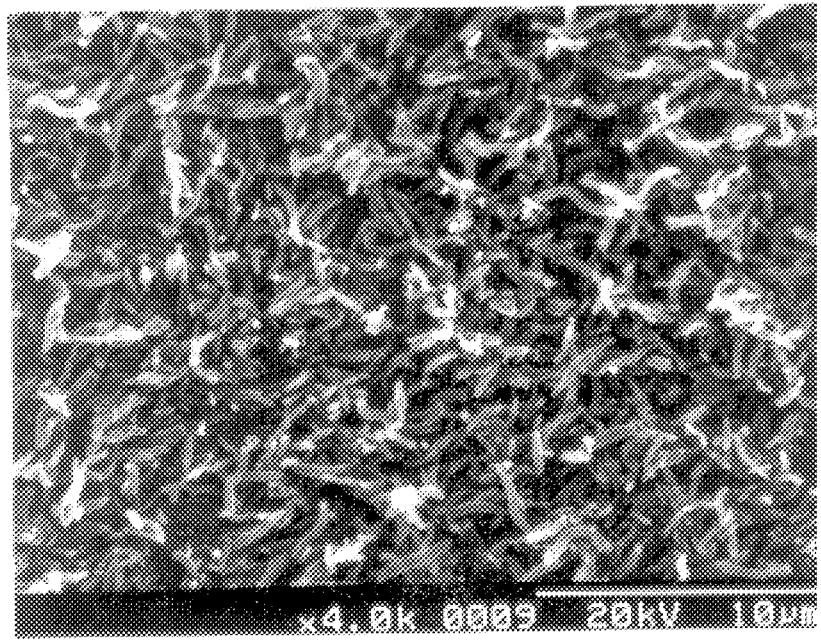
FIG. 1 is a scanning electron microscopy (SEM) micrograph of a calcined aluminosilicate crystalline material prepared in accordance with a first preferred embodiment of the present invention.

DETAILED DESCRIPTION OF PREFERRED EMBODIMENTS (A) Preparation of the microtubular morphology of aluminosilicate and pure silica crystalline materials To prepare pure-silica mesoporous crystalline materials, sodium silicate was added to a clear aqueous solution of the surfactant under stirring and a gel mixture was formed. After stirring for about 10–30 min at room temperature, a proper amount of an aqueous sulfuric acid or other acids solution was added into the gel mixture. This step took up to 10–60 minutes, and the pH value of the final mixture was reduced to about 11.5–9.0. The molar ratio of the resultant gel composition was within 1 $SiO_2$: (0.40–0.50) surfactant: (0.35–0.5) $Na_2O$:(0.30–0.70) HA:(50–200) $H_2O$. The source of the silicon was sodium silicate. The surfactants for use in the reaction system were quaternary ammonium $R_1R_2R_3R_4N^+X^-$, where one of $R_1$, $R_2$, $R_3$ and $R_4$ was alkyl chain with 8 to 20 carbon atoms, the remainders were the alkyls chains with 1 to 3 carbon atoms, $X^-$ was the counterion ($Cl^-$, $Br^-$, $NO_3^-$, $OH^-$ etc.). HA represented the acid. Then, the mixture was stirred for 10–40 min and loaded into an autoclave and statically heated at 50°–150° C. for 24–240 h. The resulting solid products were recovered by filtration, washed with deionized water and dried in air at room temperature or 100° C. To remove the organic species in the pores of mesoporous aluminosilicate, the as-synthesized samples were calcined in air at 500°–600° C. for 6–12 h (heated form room temperature to the desired temperature with a heating rate of 1.5° C./min).

The aluminosilicate was synthesized with the same process mentioned above except that a suitable amount of sodium aluminate ($Al_2O_3$:$SiO_2$<0.2) was added into the solution of surfactant in the first step. Selectively, additional sources of salts and cosurfactants were directly added into the solution of the surfactant prior to or together with sodium silicate to prepare the aluminosilicate crystalline materials.

(B) Characterization of the aluminosilicate products

Scanning electron microscopy (SEM) was performed on a Hitachi S-2400 (FIGS. 1–6) or JEOL JSM-6300 (FIG. 7) microscopes using an accelerating voltage of 20 keV. Powder x-ray diffraction (XRD) data were collected on a Scintag X1 diffractometer using Cu Kα radiation ($\lambda$=0.154 nm). The transmission electron micrographs (TEM) were taken on a Hitachi H-7100 operated at 100 keV. The $N_2$ adsorption-desorption isotherms were obtained at 77K on a Micrometric ASAP 2000 apparatus, which gave a Brunaer-Emmett-Teller (BET) surface area. The sample was degassed at 300° C. for about 6 h in $10^{-3}$ torr prior to adsorption. The data were analyzed by the BJH (Barrett-Joyner-Halenda) method with the Halsey equation for multilayer thickness. The pore size distribution curve was obtained from the analysis of the desorption portion of the isotherm.

EXAMPLE 1

To prepare the aluminosilicate MCM-41, we dissolved 0.060 g of sodium aluminate (54% $Al_2O_3$; Riede-de Haën, Germany) in 3.0 g of water and mixed this with 30.0 g of a 12% $C_{16}$TMAB(cetyltrimethylammonium bromide, 99%; Merck) aqueous solution. Then 5.3 g of sodium silicate (27% $SiO_2$ and 14% NaOH; Aldrich) was added to the above solution. After the resulting mixture was stirred for 10 minutes at room temperature, 6.0 g of 1.1M $H_2SO_4$ solution was added by pipette very slowly (total time ~30 minutes). (A fast rate of acidification results in the usual MCM-41 microparticles instead of the hollow tubule morphology reported here.) The pH of the final mixture was ~10.0. The gel mixture formed after this acidification was allowed to stand for 20 min and then was heated at 100° C. for 48 hours in an autoclave. The solid product recovered by filtration was washed with deionized water, dried at ambient conditions, and calcined at 540° C. in air for 6 hours to remove the template.

FIG. 1 shows the SEM micrograph of the calcined aluminosilicate material prepared from the cetyltrimethylammonium bromide ($C_{16}$TMAB)-aluminosilicate system. The morphology of this aluminosilicate samples is almost completely in tubular structure without micro-particles. The diameter of these tubules is nearly uniform and about 0.25 μm; the length is about 3 μm. The gel composition in terms of molar ratio is listed as follows:

1.0 moles $SiO_2$
0.48 moles $C_{16}$TMAB 0.40 moles Na$_2$O
0.28 moles H$_2$SO$_4$
0.013 moles Al$_2$O$_3$
81.0 moles H$_2$O

EXAMPLE 2

The procedures of Example 1 were repeated except that sodium aluminate was not used and cetyltrimethylammonium chloride (C$_{16}$TMACl) was used instead of cetyltrimethylammonium bromide (C$_{16}$TMAB).

Figure 2:
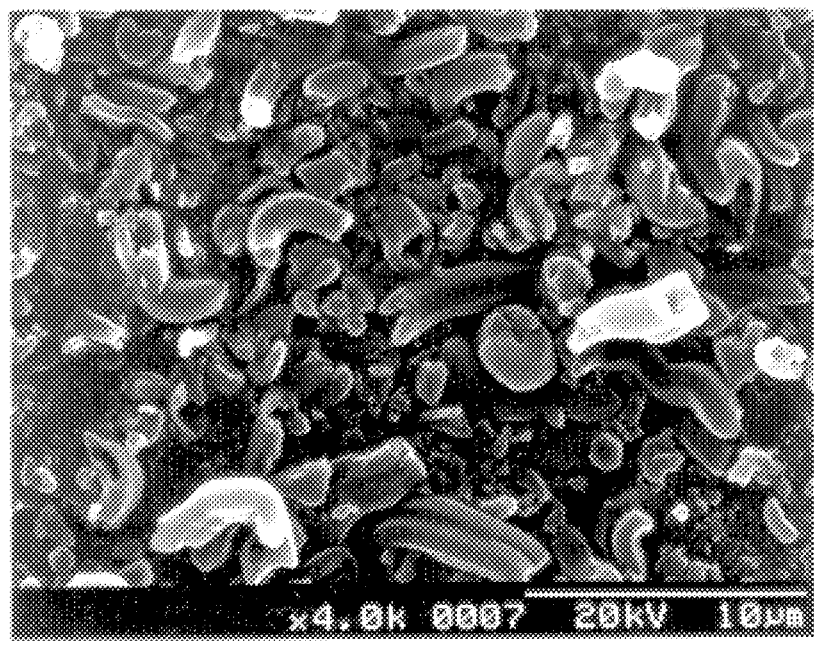
FIG. 2 is a scanning electron microscopy (SEM) micrograph of an as-synthesized pure silica crystalline material prepared in accordance with a second preferred embodiment of the present invention.

FIG. 2 displays the SEM photograph of the as-synthesized pure silica sample synthesized from the cetyltrimethylammonium chloride (C$_{16}$TMACl)-silicate system. Based on the SEM micrographs, the percentage of the particles in tubular form is more than 70% for these samples, the rest are in microparticle morphology. Some head-broken tubules reveal that the tubules are hollow. Besides, the calcined samples have the same tubular structures. The diameter of the tubules is about 1.0 μm; the length is roughly 3.6 μm. The gel composition in terms of molar ratio is listed as follows:
1.0 moles SiO$_2$
0.48 moles C$_{16}$TMACl
0.39 moles Na$_2$O
0.28 moles H$_2$SO$_4$
73.7 moles H$_2$O

EXAMPLE 3

The procedures of Example 1 were repeated except that sodium aluminate was not used and cetylpyridiniumammonium chloride (C$_{16}$PyCl) was used instead of cetyltrimethylammonium bromide (C$_{16}$TMAB).

Figure 3:
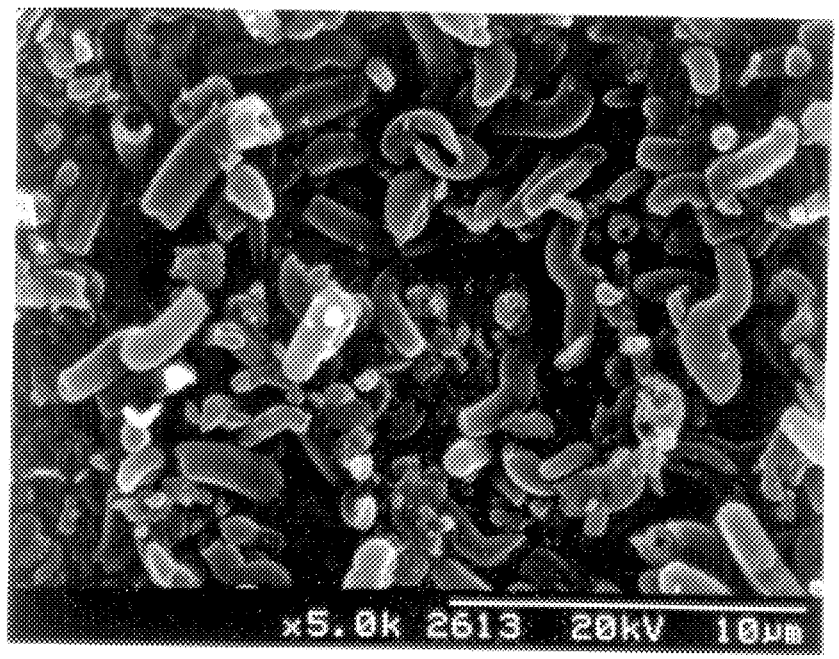
FIG. 3 is a scanning electron microscopy (SEM) micrograph of an as-synthesized pure silica crystalline material prepared in accordance with a third preferred embodiment of the present invention.

FIG. 3 shows the SEM photograph of the as-synthesized pure silica sample prepared with cetylpyridinium chloride (C$_{16}$PyCl). According to the SEM micrograph, some head-broken tubules reveal that the tubules are hollow. The percentage of the particles in tubular form is more than 80% for this sample, the rest are microparticles. The diameter of the tubules is about 0.7 μm; the length is roughly 3.8 μm. The gel composition in terms of molar ratio is listed as follows:
1.0 moles SiO$_2$
0.48 moles C$_{16}$PyCl
0.39 moles Na$_2$O
0.28 moles H$_2$SO$_4$
90.5 moles H$_2$O

EXAMPLE 4

From the view point of surfactant, the addition of a suitable amount of cosurfactants can elongate the micelles of the surfactant with shorter carbon chain length to have greater interactions with the silicate oligomers. Thus, we believe that the addition of cosurfactant can improve the morphology of the pure silica crystalline material. The procedures of Example 1 were repeated except that sodium aluminate was not used, myristyltrimethylammonium bromide (C$_{14}$TMAB) was used instead of cetyltrimethylammonium bromide (C$_{16}$TMAB), and an additional butanol (BUOH) was added together the sodium silicate.

Figure 4:
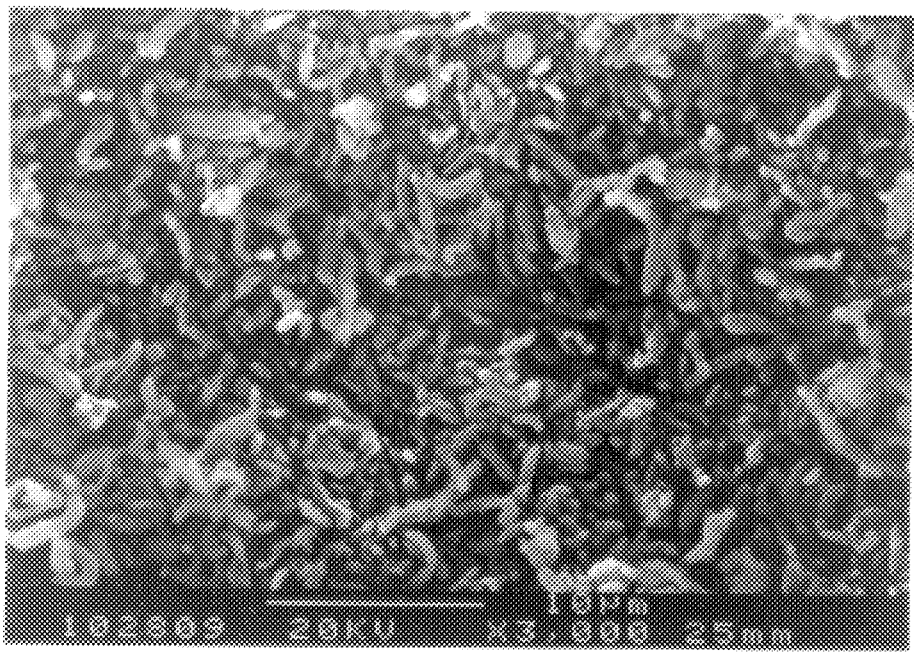
FIG. 4 is a scanning electron microscopy (SEM) micrograph of an as-synthesized pure silica crystalline material prepared in accordance with a forth preferred embodiment of the present invention.

FIG. 4 shows the SEM micrograph of the as-synthesized pure silica material prepared from myristyltrimethylammonium bromide (C$_{14}$TMAB)-silicate system under the condition of adding butanol (BuOH). This pure silica sample is almost in tubular structure (about 90%). The diameter of these tubules is nearly uniform and about 0.5 μm; the length is about 3.2 μm The gel composition in terms of molar ratio is listed as follows:
1.0 moles SiO$_2$
0.48 moles C$_{14}$TMAB
0.39 moles Na$_2$O
0.28 moles H$_2$SO$_4$
0.24 moles BuOH
88.0 moles H$_2$O

EXAMPLE 5

Adding a proper amount cosurfactants has the similar effect of refining the morphology of the aluminosilicate product prepared with dodecyltrimethylammonium bromide (C$_{12}$TMAB). The procedures of Example 4 were repeated except that C$_{14}$TMAB was replaced with dodecyltrimethylammonium bromide (C$_{12}$TMAB).

Figure 5:
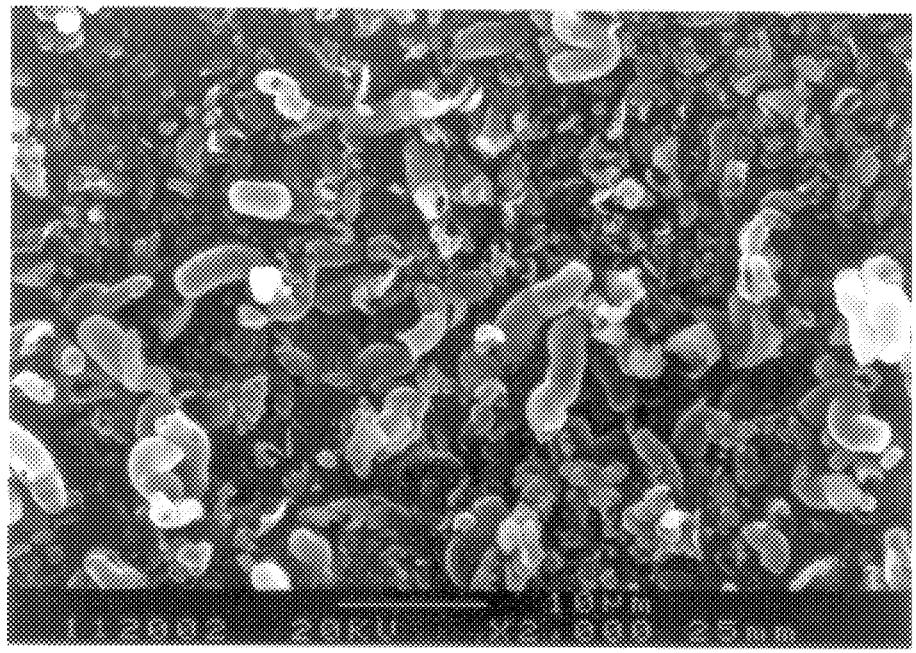
FIG. 5 is a scanning electron microscopy (SEM) micrograph of an as-synthesized pure silica crystalline material prepared in accordance with a fifth preferred embodiment of the present invention.

FIG. 5 displays the SEM photograph of the as-synthesized pure silica sample prepared with BuOH/C$_{12}$TMAB=0.95. There are many broken hollow tubules in this sample. Based on the SEM micrograph, some broken tubules reveal that the tubules are hollow. The percentage of the particles in the tubular form is more than 50% in this sample. The diameter of the tubules is about 1.5 μm; the length is roughly 8.0 μm. The gel composition in terms of molar ratio is listed as follows:
1.0 moles SiO$_2$
0.48 moles C$_{12}$TMAB
0.39 moles Na$_2$O
0.28 moles H$_2$SO$_4$
0.45 moles BuOH
105 moles H$_2$O Besides the BuOH, hexanol and pentanol also have this effect to alter the morphology and dimensions of the MCM-41 materials.

EXAMPLE 6

Figure 6:
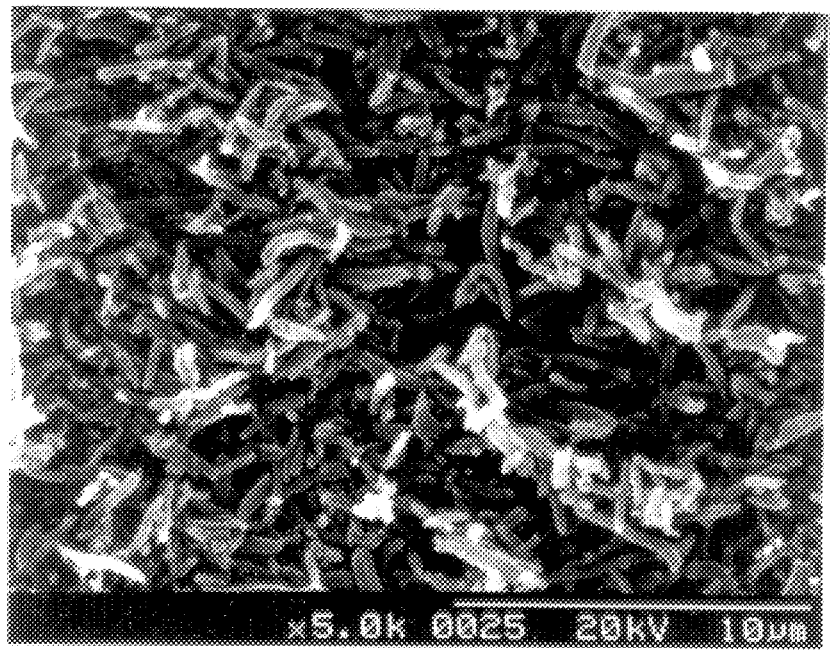
FIG. 6 is a scanning electron microscopy (SEM) micrograph of an as-synthesized aluminosilicate crystalline material prepared in accordance with a sixth preferred embodiment of the present invention.

The addition of salts, such as NaCl, NaBr, NaNO$_3$, and Na$_2$SO$_3$, etc., have the same effect of improving the morphology of the aluminosilicate material. The procedures of Example 1 were repeated except that an additional NaCl was added together the sodium silicate FIG. 6 shows the SEM micrograph of the as-synthesized aluminosilicate material prepared from cetyltrimethylammonium bromide (C$_{16}$TMAB)-aluminosilicate system with the addition of NaCl. The morphology of this MCM-41 sample is almost completely in tubular structure. The diameter of these tubules is nearly uniform and about 0.30 μm; the length is about 3 μm. The gel composition in terms of molar ratio is listed as follows:
1.0 moles SiO$_2$
0.48 moles C$_{16}$TMAB
0.40 moles Na$_2$O
0.28 moles H$_2$SO$_4$
0.013 moles Al$_2$O$_3$
0.08 moles NaCl
90.5 moles H$_2$O

EXAMPLE 7

The procedures of Example 1 were repeated except that sodium aluminate was not used.

Figure 7:
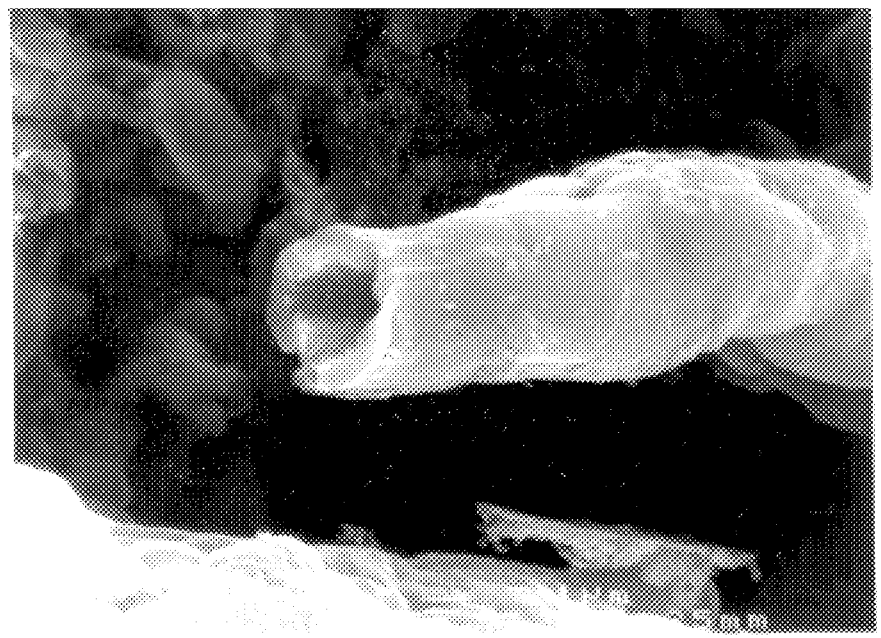
FIG. 7 is a scanning electron microscopy (SEM) micrograph of an as-synthesized pure silica crystalline material prepared in accordance with a seventh preferred embodiment of the present invention.
Figure 6:
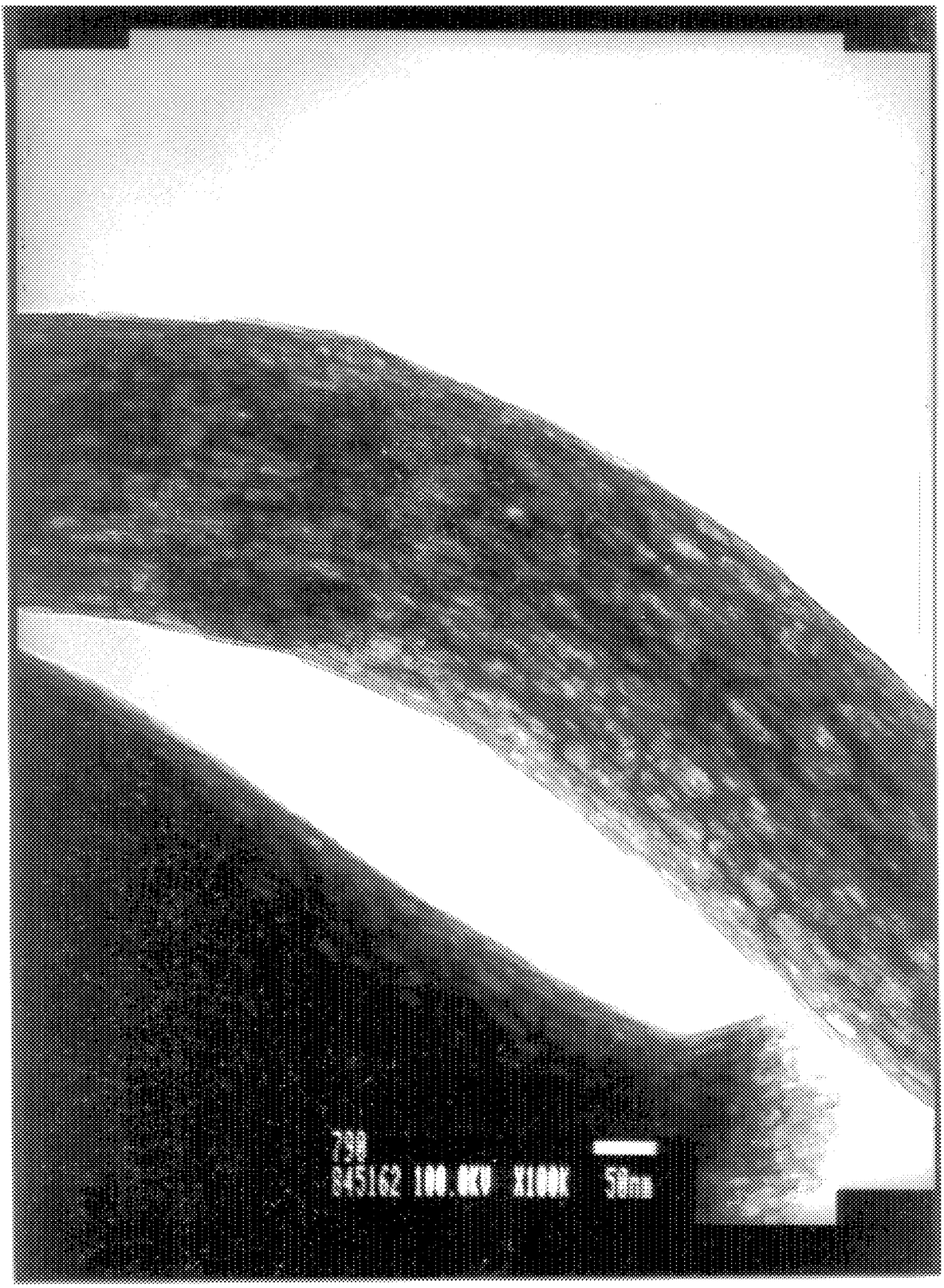

FIG. 7 is a SEM micrograph of the calcined pure silica crystalline material which also show a microtubular morphology with a much larger outer diameter (~3 μm) and length (>20 μm). The microtubule is hollow, with a wall thickness ~0.6 μm. The gel composition in terms of molar ratio is listed as follows:

1.0 moles SiO$_2$
0.48 moles C$_{16}$TMAB
0.40 moles Na$_2$O
0.28 moles H$_2$SO$_4$
81.0 moles H$_2$O FIG. 8 shows the transmission electron microscopy image of the sample of Example 1. There are parallel lines along the microtubular axial with an roughly equal distance. This distance is in agreement with the XRD result.

Figure 9:
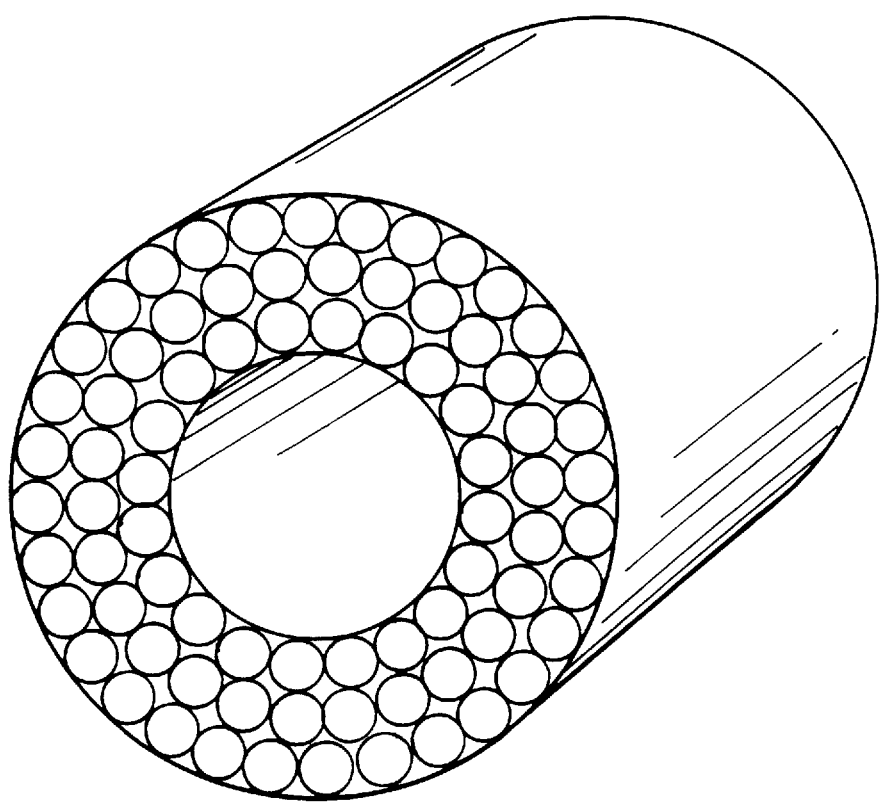
FIG. 9 is a schematic diagram of the mesoporous aluminosilicate or pure silica molecular sieve having "tubules-within-a-tubule" hierarchical order morphology of the present invention.

We propose a schematic diagram of the mesoporous aluminosilicate or pure silica molecular sieve having "tubules-within-a-tubule" hierarchical order morphology in FIG. 9. This figure is only for facilitating the understanding of "tubules-within-a-tubule" hierarchical order morphology of the mesoporous aluminosilicate or pure silica molecular sieve of the invention, and not for limiting the scope of the present invention.

Table 1 summarizes the XRD $d_{100}$ values, BET surface areas and pore sizes of the calcined crystalline materials synthesized in Examples 1–6. All of these crystalline materials have well-defined XRD patterns and sharp pore size distributions. This indicates that the nano-channels of these aluminosilicate and pure silica crystalline materials, which are formed in the wall of the micro-tubules, are highly ordered and uniform.

TABLE 1

| Example | XRD $d_{100}$ d-spacing/nm | BET surface area m$^2$/g | N$_2$ pore size nm |
| --- | --- | --- | --- |
| 1 | 3.92 | 1046 | 2.83 |
| 2 | 3.98 | 1078 | 2.87 |
| 3 | 4.01 | 1052 | 2.72 |
| 4 | 3.62 | 1063 | 2.54 |
| 5 | 3.32 | 1032 | 2.21 |
| 6 | 3.93 | 1052 | 2.82 |

The embodiments of the present invention described above is to be regarded in all respects as merely illustrative and not restrictive. Accordingly, the present invention may be embodied in other specific forms without deviating from the spirit thereof. The present invention is therefore to be limited only by the scope of the following appended claims.

What is claimed is:

1. A mesoporous aluminosilicate molecular sieve as a calcined form having the following composition:

wherein M is one or more ions selected from the group consisting of hydrogen, ammonium, alkali metals and alkaline earth metals;

n is the charge of the composition excluding the M expressed as oxide;

q is the weighted molar average valence of M;

a and b are mole fractions of Al and Si, respectively, and a+b=1, and b>0; and c is a number of from 1 to 2.5;

said molecular sieve having a microstructure composed of microparticles having a hexagonal arrangement of uniformly-sized pores having a diameter of 1.3–20 nm and exhibiting a hexagonal electron diffraction pattern that can be indexed with a $d_{100}$ value greater than 1.8 nm, characterized in that about 30–100% of said microparticles are in substantially tubular form, said substantially tubular microparticles have a diameter of 0.1–20 $\mu$m, and said substantially tubular microparticles have a wall comprising coaxial uniformly-sized pores having a diameter of 1.3–20 nm and exhibiting a hexagonal electron diffraction pattern that can be indexed with a $d_{100}$ value greater than 1.8 nm.

2. The mesoporous aluminosilicate molecular sieve according to claim 1 which has from about 70 to about 100% of said microparticles being in the substantially tubular form, and said substantially tubular microparticles having a diameter of about 0.1–5 $\mu$m.

3. The mesoporous aluminosilicate molecular sieve according to claim 1, in which M is an alkali metal ion.

4. The mesoporous aluminosilicate molecular sieve according to claim 3, in which M is sodium ion.

5. The mesoporous aluminosilicate molecular sieve according to claim 1 which has a SiO$_2$:Al$_2$O$_3$ molar ratio ranging from about 1:00 to about 1:0.2.

6. A method for preparing a molecular sieve comprising the following steps:

a) preparing an aqueous mixture comprising sources of a silicon oxide, an oxide of aluminum and a surfactant of R$_1$R$_2$R$_3$R$_4$Q$^{+X-}$, and having a composition, in terms of mole ratios, within the following range: 1 SiO$_2$:(0–0.2) Al$_2$O$_3$:(0.2–0.7) surfactant:(0–0.5) M$_{2/e}$O:(10–1000) H$_2$O wherein at least one of R$_1$, R$_2$, R$_3$, and R$_4$ is selected from the group consisting of aryl of from 6 to 36 carbon atoms, alkyl of from 6 to 36 carbon atoms and combination thereof, the remainders of R$_1$, R$_2$, R$_3$, and R$_4$ are hydrogen or alkyl of from 1 or 5 carbon atoms;

Q$^+$ is nitrogen or phosphorous ion; and X$^-$ is a counterion;

M is alkali metal or alkaline earth metal ion; and e is the weighted average valence of M;

b) agitating said aqueous mixture at a temperature of from 0° C. to room temperature for about 10 minutes to 2 hours to form a gel mixture;

c) to the gel mixture adding an acid in an amount, in terms of mole ratio, within 1 SiO$_2$:(0.1–1.0) H$^+$ while maintaining the agitation, wherein said acid is gradually added so that the addition is completed within a period of from about 5 minutes to 2 hours;

d) statically heating the resulting mixture of step c) at a temperature of from about 50° C. to 200° C. for a period of time which is sufficient to form a molecular sieve; and e) recovering the molecular sieve;

whereby said molecular sieve has a microstructure composed of microparticles having a hexagonal arrangement of uniformly-sized pores having a diameter of 1.3–20 nm and exhibiting a hexagonal electron diffraction pattern that can be indexed with a $d_{100}$ value greater than 1.8 nm, and a portion of said microparticles which are in the substantially tubular form, said substantially tubular microparticles have a diameter of 0.1–20 $\mu$m, and said substantially tubular microparticles have a wall comprising coaxial uniformly-sized pores having a diameter of 1.3–20 nm and exhibiting a hexagonal electron diffraction pattern that can be indexed with a $d_{100}$ value greater than 1.8 nm.

7. The method according to claim 6, wherein the resulting mixture from step c) is allowed to stand at room temperature with or without agitation for a period of from 5 minutes to one hour prior to the heating.

8. The method according to claim 6, wherein said composition in step a), in terms of mole ratios, is within the following range: 1 SiO$_2$:(0–0.05) Al$_2$O$_3$:(0.35–0.65) surfactant:(0.35–0.5) Na$_2$O:(60–110) H$_2$O.

9. The method according to claim 6, wherein $R_1$ of said surfactant is $C_8$–$C_{20}$ alkyl; $R_2$, $R_3$, and $R_4$ is $C_1$–$C_3$ alkyl; $Q^+$ is nitrogen ion; and $X^-$ is halide.

10. The method according to claim 6, wherein said aqueous mixture of step a) further comprises 1–50 mol % of a cosurfactant, based on said surfactant.

11. The method according to claim 10, wherein said cosurfactant is a $C_1$–$C_8$ alcohol.

12. The method according to claim 10, wherein said cosurfactant is an alkali metal salt.

* * * * *